ated Feb. 1, 1983

United States Patent [19]
Kroenke

[11] 4,371,655
[45] Feb. 1, 1983

[54] POLYMER COMPOSITIONS CONTAINING SULFATE GLASSES OR GLASS-CERAMICS

[75] Inventor: William J. Kroenke, Brecksville, Ohio

[73] Assignee: The B. F. Goodrich Company, Akron, Ohio

[21] Appl. No.: 335,937

[22] Filed: Dec. 30, 1981

[51] Int. Cl.³ .................. C08L 27/06; C08L 27/08; C08L 33/20
[52] U.S. Cl. .................. 524/423; 524/567; 524/568; 524/566
[58] Field of Search .............. 524/423; 501/11, 41

[56] References Cited
U.S. PATENT DOCUMENTS
3,869,405  3/1975  Shaw et al. .................. 252/301.6 S FOREIGN PATENT DOCUMENTS
42-26308 12/1967  Japan .................. 501/41

Primary Examiner—Lewis T. Jacobs
Attorney, Agent, or Firm—James R. Lindsay

[57] ABSTRACT

Polymer compositions are disclosed that contain finely-divided additives of sulfate glasses and sulfate glass-ceramic materials comprised of potassium sulfate and zinc sulfate as smoke retardant additives. Glass sulfates and glass-ceramic materials comprised of potassium sulfate, zinc sulfate and sodium sulfate produce results superior to those obtained using the potassium sulfate-zinc sulfate binary system. The inclusion of a transition metal sulfate as a component of the sulfate glass or sulfate glass-ceramic material also produces superior results over those resulting from use of the potassium sulfate-zinc sulfate binary glasses and glass-ceramic materials.

8 Claims, No Drawings

POLYMER COMPOSITIONS CONTAINING SULFATE GLASSES OR GLASS-CERAMICS

BACKGROUND OF THE INVENTION

As a result of recent hotel and high-rise apartment building fires, the importance of improving fire and smoke retardancy characteristics of plastic and rubber materials used in homes, apartment buildings, hotels, office buildings, passenger cars, and other places in which people congregate has become ever more apparent. Recent research has revealed a number of additives which can be added to compositions to improve the fire and/or smoke retardant characteristics of the compositions. Among the recognized additives that benefit the fire and/or smoke retardancy of plastic and rubber compositions are a number of metal oxides (such as zinc oxide, bismuth trioxide, molybdenum trioxide, litharge, vanadium pentoxide, tungstic oxide, cadmium oxide and antimony trioxide), certain phosphorous compounds (such as tricresyl phosphate, triphenyl phosphate, tributyl phosphate, tris (2-ethylhexyl) phosphate and tris(2,3-dichloropropyl) phosphate), certain halogen-containing compounds (such as chlorinated waxes, antimony trihalides and antimony oxyhalides), and amine molybdates (such as melamine molybdate, ammelimium beta-octamolybdate, dicyclohexylammonium alpha-octamolybdate, didodecylammonium beta-ctamolybdate and tripentylammonium decamolybdate).

Even though a variety of smoke and fire retardant additives for plastic and rubber compositions are available, new highly effective smoke and/or fire retardant additives still are desired.

SUMMARY OF THE INVENTION

It now has been found that a variety of sulfate glasses and glass-ceramics when pulverized and added to plastic and certain rubber compositions function as effective smoke retardants and, in many cases, function effectively as both smoke retardants and fire retardants.

Glasses are amorphous undercooled liquids of extremely high viscosities that have the appearance of a solid. They generally are formed by heating together a mixture of inorganic metallic compounds (usually metallic oxides) to a temperature above which the metallic compounds fuse to form a molten melt. Thereafter the melt is cooled (usually at a slow rate) to a temperature below that at which the fused mass flows (the liquidus temperature). In addition to the common commercial glasses formed from a mixture of silica, soda ash and lime (combined frequently with additional metallic oxides, such as oxides of calcium, lead, lithium and cerium), a variety of less common glasses are known (such as glasses made from the oxides of boron or the oxides of phosphorous). Some potential glass-forming melts have a tendency upon cooling to devitrify and form a finely-grained crystalline phase dispersed in a glassy matrix, rather than an amorphous product (glass). Such partly crystalline products often are referred to as "glass-ceramic" materials. Frequently, when the tendency to form a crystalline product is prevalent, the glass-ceramic material can contain 95–100% of the crystalline product.

It previously was found that it is possible to form binary sulfate glasses from combinations of potassium sulfate and zinc sulfate (reported in the article by C. Austen Angell published in the "Journal of American Ceramics Society", Vol. 48, page 450, (1965). In my copending application Ser. No. 332,427, filed Dec. 21, 1981, entitled "Sulfate Glass Compositions", I disclose a glass composition comprised of sodium sulfate, potassium sulfate and zinc sulfate. Although amorphous products can be formed from the potassium sulfate-zinc sulfate binary system and from compositions comprised of sodium sulfate, potassium sulfate and zinc sulfate, both systems have a tendency to devitrify upon being cooled from a molten melt unless the melt is cooled rapidly to a temperature significantly below the melt's liquidus temperature (e.g., a temperature about 200° to 300° C. below the liquidus temperature).

The present invention pertains to the use of sulfate glasses comprised of potassium sulfate and zinc sulfate and glass-ceramic materials comprised of potassium sulfate and zinc sulfate as smoke retardant additives for polymers selected from the group consisting of vinyl chloride polymers, vinylidene chloride polymers, polychloroprenes, poly(vinyl acetate), and polymers of acrylonitrile alone or with styrene.

DETAILED DESCRIPTION OF THE INVENTION

In accordance with the present invention, sulfate glasses comprised of potassium sulfate and zinc sulfate and glass-ceramic materials comprised of potassium sulfate and zinc sulfate, or mixtures thereof, are added in finely-divided particulate form to polymers selected from the group consisting of vinyl chloride polymers, vinylidene chloride polymers, polychloroprenes, poly(vinyl acetate), and polymers of acrylonitrile alone or with styrene, or to mixtures of such polymers, to improve the smoke retardant properties of the polymers. The sulfate glasses or glass-ceramic materials desirably are added as a fine powdery material having an average particle size from about 0.01 to about 800 microns, preferably from about 0.01 to 200 microns, and even more preferably from about 0.5 to about 50 microns. The glasses or glass-ceramic materials can be pulverized by any convenient manner, such as by grinding or ball milling the glass or glass-ceramic material until a desired particle size is obtained.

The sulfate glasses or glass-ceramics are formed by the fusion of a mixture comprised predominantly (i.e., an amount greater than 50 mol percent) of a combination of potassium sulfate and zinc sulfate. The components of the mixture can be either in anhydrous form or in a hydrate form or can be a mixture of anhydrous and hydrate materials. Desirably, the materials are ground or otherwise pulverized to a fine particulate state (preferably to an average particle size below 150 microns) before fusion of the mix is attempted. The mixture then is heated to a temperature at which fusion occurs. The fused melt is cooled to a temperature below the liquidus temperature of the melt. Since devitrification of the fused mass has a tendency to take place the slower a fused melt is cooled, devitrification can be prevented, or at least reduced, by more quickly cooling the melt to a temperature significantly below the liquidus temperature. One method of quickly quenching the melt is to pour the molten melt onto a chilled metal surface (for example, a chilled metal plate cooled to dry ice temperature (−78° C.)). Many of the sulfate glasses and sulfate glass-ceramic materials have melting points below 500° C. The low melting additives can be beneficial in improving the fire retardancy of polymer materials, as will be explained more fully hereinafter.

The sulfate glasses and sulfate glass-ceramic materials useful in the present invention can be a binary composition composed solely of potassium sulfate and zinc sulfate, but, desirably, are compositions comprised predominantly of potassium sulfate and zinc sulfate with one or more other metallic sulfates (present in a minor proportion). A preferred class of sulfate glasses and sulfate glass-ceramic materials useful in the present invention are compositions comprised predominantly of potassium sulfate and zinc sulfate and containing a minor (i.e., less than 50 mol percent) proportion of sodium sulfate. The addition of a minor proportion of a transition metal sulfate to the mixture from which the sulfate glass or sulfate glass-ceramic is formed often produces a product that is superior to the product which would be formed if the transition metal sulfate component were eliminated from the composition. The most preferred class of sulfate glasses and sulfate glass-ceramic materials are those sulfate glass and sulfate glass-ceramic compositions comprising the following components in the specified concentrations (expressed in mol percents):

| Component | Concentration (mol %) |
| --- | --- |
| Potassium sulfate | 10 to 60 |
| Zinc sulfate | 25 to 75 |
| Sodium sulfate | 0 to 50 |
| Transition metal sulfate | 0 to 20 |

Typical transition metal sulfates are ceric sulfate, manganous sulfate, nickel sulfate, cupric sulfate and vanadyl sulfate.

As indicated above, the polymers useful in the polymer compositions of the present invention are vinyl chloride polymers, vinylidene chloride polymers, polychloroprenes (neoprene rubbers), poly(vinyl acetate), and polymers of acrylonitrile alone or with styrene.

Vinyl chloride polymers and vinylidene chloride polymers used in this invention include homopolymers, copolymers and blends of homopolymers and/or copolymers. The vinyl chloride polymers and vinylidene chloride polymers may contain from 0 to about 50 percent of at least one other olefinically unsaturated monomer, more preferably from 0 to about 50 percent by weight of at least one other vinylidene monomer (i.e., a monomer containing at least one terminal $CH_2=C<$ group per molecule) copolymerized therewith, even more preferably from 0 to about 20 percent by weight of such vinylidene monomer. Suitable monomers include 1-olefins containing from 2 to 12 carbon atoms, more preferably from 2 to 8 carbon atoms, such as ethylene, propylene, 1-butene, isobutylene, 1-hexane, 4-methyl-1-pentene, and the like; dienes containing from 4 to 10 carbon atoms, including conjugated dienes such as butadiene, isoprene, piperylene, and the like; ethylidene norobornene and dicyclopentadiene; vinyl esters and allyl esters such as vinyl acetate, vinyl chloroacetate, vinyl propionate, vinyl laurate, alkyl acetate, and the like; vinyl aromatics such as styrene, α-methyl styrene, chlorostyrene, vinyl toluene, vinyl naphthalene, and the like; vinyl and allyl ethers and ketones such as vinyl methyl ether, allyl methyl ether, vinyl isobutyl ether, vinylnbutyl ether, vinyl chloroethyl ether, methylvinyl ketone, and the like; vinyl nitriles such as acrylonitrile, methacrylonitrile, and the like; cyanoalkyl acrylates such as α-cyanomethyl acrylate, the α-β-and γ-cyanopropyl acrylates, and the like; olefinically unsaturated carboxylic acids and esters thereof, including α,β-olefinically unsaturated acids and esters thereof such as methyl acrylate, ethyl acrylate, chloropropylacrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate, and the like; and including esters of maleic and fumaric acid, and the like; amides of the α,β-olefinically unsaturated carboxylic acids such as acryladmide, and the like, divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis (β-haloalkyl) alkenyl phosphonates such as bis (β-chloroethyl) vinyl phosphonate, and the like. Also included are "post chlorinated" vinyl chloride and vinylidene chloride polymers.

The sulfate glasses and sulfate glass-ceramic materials are added to the polymer by any convenient manner, such as by mixing them together on a roll mill or in a Banbury mixer. Generally from 5 to 60 parts by weight, preferably from 10 to 40 parts by weight, of the sulfate glass or sulfate glass-ceramic material, or combinations thereof per 100 parts by weight of polymer are added to the polymer composition. The compositions, in addition to the sulfate glass and/or sulfate glass-ceramic smoke retardant additive(s), may contain the usual compounding ingredients normally used in such polymer compositions, such as fillers, stabilizers, opacifiers, lubricants, processing aids, impact modifiers, plasticizers, antioxidants, and the like. If desired, one or more smoke and-/or fire retardants, in addition to the sulfate glass and-/or sulfate glass-ceramic additive(s), can be added to the polymer composition.

The smoke retardancy of the polymer compositions of the present invention can be measured using an NBS Smoke Chamber according to procedures described in ASTM E662-79 entitled, "Test for Specific Optical Density of Smoke Generated by Solid Materials". Maximum smoke density (Dm) is a dimensionless number and has the advantage of representing a smoke density independent of chamber volume, specimen size or photometer path length, provided a consistent dimensional system is used. Percent smoke reduction is calculated using the equation:

$$\frac{Dm/g \text{ of control} - Dm/g \text{ of sample}}{Dm/g \text{ of control}} \times 100$$

The term "Dm/g" means maximum smoke density per gram of test sample. Dm and other aspects of the physical optics of light transmission through smoke are discussed fully in the aforesaid ASTM testing procedure.

The present invention will be more fully understood by reference to the following examples:

EXAMPLE 1

The following sulfates were ground together in the specified proportions to form a pulverized mixture:

| Sulfate | Weight (grams) |
| --- | --- |
| Potassium sulfate ($K_2SO_4$) | 70 |
| Zinc sulfate ($ZnSO_4.7H_2O$) | 270 |

The resultant mixture was heated in a porcelain dish for one hour in a muffle furnace maintained at 560° C. A clear melt was formed. The melt was quenched to a temperature below the liquidus temperature of the melt by pouring the melt rapidly onto a large polished steel plate maintained at room temperature (25° C.). A partly devitrified glass (Sample 1) was formed having the following sulfate concentrations:

| Sulfate | Concentration (mol %) |
| --- | --- |
| $K_2SO_4$ | 40.0 |
| $ZnSO_4$ | 60.0 | and a liquidus temperature of about 450° C.

EXAMPLE 2

The following sulfates were ground together in the specified proportions to form a pulverized mixture:

| Sulfate | Weight (grams) |
| --- | --- |
| Potassium sulfate ($K_2SO_4$) | 174 |
| Sodium sulfate ($Na_2SO_4$) | 142 |
| Zinc sulfate ($ZnSO_4.7H_2O$) | 449 |

The resultant mixture was fused and quenched as described in Example 1. A partly devitrified glass (Sample 2) was formed having the following sulfate concentrations:

| Sulfate | Concentration (mol %) |
| --- | --- |
| $K_2SO_4$ | 25.0 |
| $NaSO_4$ | 25.0 |
| $ZnSO_4$ | 50.0 | and a liquidus temperature of 420° C.

EXAMPLE 3

The following sulfates were ground together in the specified proportions to form a pulverized mixture:

| Sulfate | Weight (grams) |
| --- | --- |
| Potassium sulfate ($K_2SO_4$) | 43.5 |
| Sodium sulfate ($Na_2SO_4$) | 35.5 |
| Zinc sulfate ($ZnSO_4.7H_2O$) | 71.9 |
| Nickel sulfate ($NiSO_4$) | 38.7 |

The resultant mixture was heated in a porcelain dish for one hour in a muffle furnace maintained at 560° C. A viscous brown melt was formed. The melt was poured onto an aluminum plate cooled to dry ice temperature (−78.5° C.) to cool the melt rapidly to a temperature below the liquidus temperature of the melt. A yellow-orange glass-ceramic material (Sample 3) was formed having the following sulfate concentrations:

| Sulfate | Concentration (mol %) |
| --- | --- |
| $K_2SO_4$ | 25.0 |
| $Na_2SO_4$ | 25.0 |
| $ZnSO_4$ | 25.0 |
| $NiSO_4$ | 25.0 |

EXAMPLE 4

The following sulfates were ground together in the specified proportions to form a pulverized mixture:

| Sulfate | Weight (grams) |
| --- | --- |
| Potassium sulfate ($K_2SO_4$) | 30.6 |
| Sodium sulfate ($Na_2SO_4$) | 33.4 |
| Zinc sulfate ($ZnSO_4.7H_2O$) | 135.4 |
| Cupric sulfate ($CuSO_4$) | 18.8 |

The resultant mixture was fused and quenched as described in Example 3. A transparent blue-green glass (Sample 4) was formed having the following sulfate concentrations:

| Sulfate | Concentration (mol %) |
| --- | --- |
| $K_2SO_4$ | 17.6 |
| $Na_2SO_4$ | 23.5 |
| $ZnSO_4$ | 47.1 |
| $CuSO_4$ | 11.8 |

EXAMPLE 5

The following sulfates were ground together in the specified proportions to form a pulverized mixture:

| Sulfate | Weight (grams) |
| --- | --- |
| Potassium sulfate ($K_2SO_4$) | 30.6 |
| Sodium sulfate ($Na_2SO_4$) | 33.4 |
| Zinc sulfate ($ZnSO_4.7H_2O$) | 135.4 |
| Nickel sulfate ($NiSO_4$) | 18.3 |

The resultant mixture was fused and quenched as described in Example 3. A yellow-orange glass-ceramic material (Sample 5) was formed having the following sulfate concentrations:

| Sulfate | Concentration (mol %) |
| --- | --- |
| $K_2SO_4$ | 17.6 |
| $NaSO_4$ | 23.5 |
| $ZnSO_4$ | 47.1 |
| $NiSO_4$ | 11.8 |

EXAMPLE 6

The following sulfates were ground together in the specified proportions to form a pulverized mixture:

| Sulfate | Weight (grams) |
| --- | --- |
| Potassium sulfate ($K_2SO_4$) | 30.6 |
| Sodium sulfate ($Na_2SO_4$) | 33.4 |
| Zinc sulfate ($ZnSO_4.7H_2O$) | 135.4 |
| Vanadyl sulfate ($VOSO_4.2H_2O$) | 23.5. |

The resultant mixture was fused and quenched as described in Example 3. A transparent dark purple glass (Sample 6) was formed having the following sulfate concentrations:

| Sulfate | Concentration (mol %) |
| --- | --- |
| $K_2SO_4$ | 17.6 |
| $Na_2SO_4$ | 23.5 |
| $ZnSO_4$ | 47.1 |

| -continued | |
| --- | --- |
| Sulfate | Concentration (mol %) |
| $VOSO_4$ | 11.8 |

EXAMPLE 7

The following sulfates were ground together in the specified proportions to form a pulverized mixture:

| Sulfate | Weight (grams) |
| --- | --- |
| Potassium sulfate ($K_2SO_4$) | 27.55 |
| Sodium sulfate ($Na_2SO_4$) | 22.46 |
| Zinc sulfate ($ZnSO_4.H_2O$) | 38.37 |
| Nickel sulfate ($NiSO_4.6H_2O$) | 39.89 |
| Cobalt sulfate ($CoSO_4.7H_2O$) | 1.78 |

The resultant mixture was fused and quenched as described in Example 3. A light gold glass-ceramic (Sample 7) was formed having the following sulfate concentrations:

| Sulfate | Concentration (mol %) |
| --- | --- |
| $K_2SO_4$ | 25.0 |
| $Na_2SO_4$ | 25.0 |
| $ZnSO_4$ | 25.0 |
| $NiSO_4$ | 24.0 |
| $CoSO_4$ | 1.0 |

EXAMPLE 8

The following sulfates were ground together in the specified proportions to form a pulverized mixture:

| Sulfate | Weight (grams) |
| --- | --- |
| Potassium sulfate ($K_2SO_4$) | 27.54 |
| Sodium sulfate ($Na_2SO_4$) | 22.45 |
| Zinc sulfate ($NiSO_4.H_2O$) | 28.36 |
| Nickel sulfate ($NiSO_4.6H_2O$) | 39.30 |
| Cobalt sulfate ($CoSO_4.7H_2O$) | 2.44 |

The resultant mixture was fused and quenched as described in Example 3. A light tan glass-ceramic (Sample 8) was formed having the following sulfate concentrations:

| Sulfate | Concentration (mol %) |
| --- | --- |
| $K_2SO_4$ | 25.0 |
| $NaSO_4$ | 25.0 |
| $ZnSO_4$ | 25.0 |
| $NiSO_4$ | 23.62 |
| $CoSO_4$ | 1.38 |

EXAMPLE 9

The following sulfates were ground together in the specified proportions to form a pulverized mixture:

| Sulfate | Weight (grams) |
| --- | --- |
| Potassium sulfate ($K_2SO_4$) | 27.55 |
| Sodium sulfate ($Na_2SO_4$) | 22.46 |
| Zinc sulfate ($ZnSO_4.H_2O$) | 28.37 |
| Nickel sulfate ($NiSO_4.6H_2O$) | 38.65 |
| Cobalt sulfate ($CoSO_4.7H_2O$) | 3.11 |

The resultant mixture was fused and quenched as described in Example 3. A tan glass-ceramic (Sample 9) was formed having the following sulfate concentrations:

| Sulfate | Concentration (mol %) |
| --- | --- |
| $K_2SO_4$ | 25.0 |
| $Na_2SO_4$ | 25.0 |
| $ZnSO_4$ | 25.0 |
| $NiSO_4$ | 23.25 |
| $CoSO_4$ | 1.75 |

EXAMPLE 10

The following sulfates were ground together in the specified proportions to form a pulverized mixture:

| Sulfate | Weight (grams) |
| --- | --- |
| Potassium sulfate ($K_2SO_4$) | 27.55 |
| Sodium sulfate ($Na_2SO_4$) | 22.46 |
| Zinc sulfate ($ZnSO_4.H_2O$) | 25.52 |
| Nickel sulfate ($NiSO_4.6H_2O$) | 19.57 |
| Cobalt sulfate ($CoSO_4.7H_2O$) | 4.90. |

The resultant mixture was fused and quenched as described in Example 3. A rose-colored glass-ceramic (Sample 10) was formed having the following sulfate concentrations:

| Sulfate | Concentration (mol %) |
| --- | --- |
| $K_2SO_4$ | 25.0 |
| $Na_2SO_4$ | 25.0 |
| $ZnSO_4$ | 25.0 |
| $NiSO_4$ | 20.0 |
| $CoSO_4$ | 5.0 |

EXAMPLE 11

The following sulfates were ground together in the specified proportions to form a pulverized mixture:

| Sulfate | Weight (grams) |
| --- | --- |
| Potassium sulfate ($K_2SO_4$) | 27.55 |
| Sodium sulfate ($Na_2SO_4$) | 22.45 |
| Zinc sulfate ($ZnSO_4.H_2O$) | 28.36 |
| Nickel sulfate ($NiSO_4.6H_2O$) | 24.93 |
| Cobalt sulfate ($CoSO_4.7H_2O$) | 17.77 |

The resultant mixture was fused and quenched as described in Example 3. A plum-colored glass-ceramic (Sample 11) was formed having the following sulfate concentrations:

| Sulfate | Concentration (mol %) |
| --- | --- |
| $K_2SO_4$ | 25.0 |
| $Na_2SO_4$ | 25.0 |
| $ZnSO_4$ | 25.0 |
| $NiSO_4$ | 15.0 |
| $CoSO_4$ | 10.0 |

Examples 7–11 illustrate how variances in color often can be realized by slight alterations in the quantities of the constituents from which the material is formed.

EXAMPLE 12

The following sulfates were ground together in the specified proportions to form a pulverized mixture:

| Sulfate | Weight (grams) |
| --- | --- |
| Potassium sulfate ($K_2SO_4$) | 27.36 |
| Sodium sulfate ($Na_2SO_4$) | 22.41 |
| Zinc sulfate ($ZnSO_4 \cdot H_2O$) | 28.31 |
| Nickel sulfate ($NiSO_4 \cdot 6H_2O$) | 38.78 |
| Cobalt sulfate ($CoSO_4 \cdot 7H_2O$) | 2.66 |
| Chromium potassium sulfate [$CrK(SO_4)_2 \cdot 12H_2O$]. | 0.79 |

The resultant mixture was fused and quenched as described in Example 3. A light tan glass-ceramic (Sample 12) was formed having the following sulfate concentrations:

| Sulfate | Concentration (mol %) |
| --- | --- |
| $K_2SO_4$ | 24.88 |
| $Na_2SO_4$ | 25.0 |
| $ZnSO_4$ | 25.0 |
| $NiSO_4$ | 23.37 |
| $CoSO_4$ | 1.5 |
| $CrK(SO_4)_2$ | 0.25 |

EXAMPLE 13

The following sulfates were ground together in the specified proportions to form a pulverized mixture:

| Sulfate | Weight (grams) |
| --- | --- |
| Potassium sulfate ($K_2SO_4$) | 27.17 |
| Sodium sulfate ($Na_2SO_4$) | 22.37 |
| Zinc sulfate ($ZnSO_4 \cdot H_2O$) | 28.26 |
| Nickel sulfate ($NiSO_4 \cdot 6H_2O$) | 39.33 |
| Cobalt sulfate ($CoSO_4 \cdot 7H_2O$) | 1.77 |
| Chromium potassium sulfate [$CrK(SO_4)_2 \cdot 12H_2O$] | 1.58 |

The resultant mixture was fused and quenched as described in Example 3. A light gold glass-ceramic (Sample 13) was formed having the following sulfate concentrations:

| Sulfate | Concentration (mol %) |
| --- | --- |
| $K_2SO_4$ | 24.75 |
| $Na_2SO_4$ | 25.0 |
| $ZnSO_4$ | 25.0 |
| $NiSO_4$ | 23.75 |
| $CoSO_4$ | 1.0 |
| $CrK(SO_4)_2$ | 0.50. |

EXAMPLE 14

The following sulfates were ground together in the specified proportions to form a pulverized mixture:

| Sulfate | Weight (grams) |
| --- | --- |
| Potassium sulfate ($K_2SO_4$) | 27.51 |
| Sodium sulfate ($Na_2SO_4$) | 22.42 |
| Zinc sulfate ($ZnSO_4 \cdot H_2O$) | 28.33 |
| Nickel sulfate ($NiSO_4 \cdot 6H_2O$) | 33.19 |
| Cupric sulfate ($CuSO_4 \cdot 5H_2O$) | 7.88 |

The resultant mixture was fused and quenched as described in Example 3. A yellow glass-ceramic (Sample 14) was formed having the following sulfate concentrations:

| Sulfate | Concentration (mol %) |
| --- | --- |
| $K_2SO_4$ | 25.0 |
| $Na_2SO_4$ | 25.0 |
| $ZnSO_4$ | 25.0 |
| $NiSO_4$ | 20.0 |
| $CuSO_4$ | 5.0 |

EXAMPLE 15

The following sulfates were ground together in the specified proportions to form a pulverized mixture:

| Sulfate | Weight (grams) |
| --- | --- |
| Potassium sulfate ($K_2SO_4$) | 26.06 |
| Sodium sulfate ($Na_2SO_4$) | 22.12 |
| Zinc sulfate ($ZnSO_4 \cdot H_2O$) | 27.95 |
| Nickel sulfate ($NiSO_4 \cdot 7H_2O$) | 39.30 |
| Chromium potassium sulfate [$CrK(SO_4)_2 \cdot 12H_2$)] | 6.22 |

The resultant mixture was fused and quenched as described in Example 3. A yellow-green glass-ceramice (Sample 15) was formed having the following sulfate concentrations:

| Sulfate | Concentration (mol %) |
| --- | --- |
| $K_2SO_4$ | 24.0 |
| $Na_2SO_4$ | 25.0 |
| $ZnSO_4$ | 25.0 |
| $NiSO_4$ | 24.0 |
| $CrK(SO_4)_2$ | 2.0. |

EXAMPLE 16

The following sulfates were ground together in the specified proportions to form a pulverized mixture:

| Sulfate | Weight (grams) |
| --- | --- |
| Potassium sulfate ($K_2SO_4$) | 27.51 |
| Sodium sulfate ($Na_2SO_4$) | 22.42 |
| Zinc sulfate ($ZnSO_4 \cdot H_2O$) | 28.32 |
| Nickel sulfate ($NiSO_4 \cdot 6H_2O$) | 39.83 |
| Vanadyl sulfate ($VoSO_4 12H_2O$) | 1.26 |

The resultant mixture was fused and quenched as described in Example 3. A light yellow-green glass-ceramic (Sample 16) was formed having the following sulfate concentrations:

| Sulfate | Concentration (mol %) |
| --- | --- |
| $K_2SO_4$ | 25.0 |
| $Na_2SO_4$ | 25.0 |
| $ZnSO_4$ | 25.0 |
| $NiSO_4$ | 24.0 |
| $VoSO_4$ | 1.0 |

EXAMPLES 17–39

Examples 17–39 demonstrate the improvement in smoke retardancy of vinyl chloride polymers to which sulfate glasses and sulfate glass-ceramic materials have been added. Samples of the sulfate glasses or sulfate glass-ceramic material formed in Examples 1–16 (Samples 1 through 16, respectively) were used to demonstrate the improvement. Testing was performed using the flaming mode of the NBS Smoke Chamber Test (ASTM E662-79) described hereinabove. The following recipe was used:

| Material | Parts by Weight |
| --- | --- |
| Polyvinyl chloride resin* | 100.0 |
| Lubricant** | 2.0 |
| Tin stabilizer*** | 2.0 |
| Sulfate glass or glass-ceramic | varied |

*Homopolymer of vinyl chloride having an inherent viscosity of about 0.98–1.04, ASTM classification GP-5-15443.
**A commercial polyethylene powder lubricant (Microthene 510).
***Tin thioglycolate.

The ingredients of the recipe were dry-mixed and banded on a two-roll mill for about 5 minutes at a roll temperature of about 165° C.. The milled compositions were pressed into 6×6×0.025 inch sheets. Pressing was done at about 160° C. for 5 minutes using 40,000 pounds (about 14,900 Kg) of force applied to a 4-inch ram. The sample received a 2 minute preheat before being pressed. Test results are given in Table I.

TABLE I

| Example | Sample | Parts/Wt* | Dm/g | Smoke Reduction (%) |
| --- | --- | --- | --- | --- |
| 17 (Control) | — | — | 71 | — |
| 18 | Sample 1 | 10 | 32 | 55 |
| 19 | Sample 1 | 40 | 23 | 68 |
| 20 | Sample 2 | 10 | 35 | 51 |
| 21 | Sample 2 | 40 | 14 | 80 |
| 22 | Sample 3 | 10 | 34 | 52 |
| 23 | Sample 3 | 40 | 20 | 74 |
| 24 | Sample 4 | 10 | 25 | 65 |
| 25 | Sample 4 | 40 | 17 | 78 |
| 26 | Sample 5 | 10 | 28 | 60 |
| 27 | Sample 5 | 40 | 17 | 78 |
| 28 | Sample 6 | 10 | 26 | 63 |
| 29 | Sample 6 | 40 | 13 | 83 |
| 30 | Sample 7 | 10 | 30 | 58 |
| 31 | Sample 8 | 10 | 32 | 55 |
| 32 | Sample 9 | 10 | 34 | 52 |
| 33 | Sample 10 | 10 | 32 | 55 |
| 34 | Sample 11 | 10 | 36 | 49 |
| 35 | Sample 12 | 10 | 35 | 51 |
| 36 | Sample 13 | 10 | 34 | 52 |
| 37 | Sample 14 | 10 | 25 | 65 |
| 38 | Sample 15 | 10 | 24 | 66 |
| 39 | Sample 16 | 10 | 25 | 65 |

*Per 100 parts by weight of polymer

EXAMPLES 40–54

Examples 40–54 illustrate the use of sulfate glasses and sulfate glass-ceramic materials as smoke retardant additives for vinyl chloride polymers when used in combination with another known smoke retardant additive (MoO₃). Samples of the sulfate glasses or sulfate glass-ceramic materials formed in Examples 1–6 (Samples 1 through 6, respectively) were used. The same vinyl chloride polymer composition recipe and smoke retardancy test procedure as used in Examples 17–39 were used. The test results are given in Table II.

TABLE II

| Example | Sample | Pts/Wt* | Second Additive | Pts/Wt* | Dm/g | Smoke Reduction (%) |
| --- | --- | --- | --- | --- | --- | --- |
| 40 | — | — | — | — | 71 | — |
| 41 (Control) | Sample 1 | 10 | MoO₃ | 5 | 20 | 72 |
| 42 | Sample 1 | 40 | MoO₃ | 5 | 10 | 86 |
| 43 | Sample 1 | 10 | Fe₂O₃/NiO** | 5 | 16 | 77 |
| 44 | Sample 2 | 10 | MoO₃ | 5 | 11 | 84 |
| 45 | Sample 2 | 40 | MoO₃ | 5 | 5.5 | 93 |
| 46 | Sample 2 | 10 | Fe₂O₃/NiO** | 5 | 13 | 82 |
| 47 | Sample 3 | 10 | MoO₃ | 5 | 19 | 73 |
| 48 | Sample 3 | 40 | MoO₃ | 5 | 10 | 87 |
| 49 | Sample 4 | 10 | MoO₃ | 5 | 15 | 79 |
| 50 | Sample 4 | 40 | MoO₃ | 5 | 8 | 89 |
| 51 | Sample 5 | 10 | MoO₃ | 5 | 19 | 73 |
| 52 | Sample 5 | 40 | MoO₃ | 5 | 10 | 87 |
| 53 | Sample 6 | 10 | MoO₃ | 5 | 18 | 75 |
| 54 | Sample 6 | 40 | MoO₃ | 5 | 7 | 91 |

*Per 100 parts by weight of polymer
**1:4 weight ratio of Fe₂O₃/NiO

EXAMPLE 55

10 parts by weight of the sulfate product of Example 2 per 100 parts by weight of polymer were added to a polychloroprene rubber (DuPont Neoprene W) to form Sample 55 and 10 parts by weight of the sulfate product of Example 3 per 100 parts by weight of polymer were added to a separate sample of the polychloroprene rubber to form Sample 56. The samples were prepared and tested according to the Goodrich Smoke-Char Test described in U.S. Pat. No. 4,234,472, the disclosure thereof being included herein by reference. The two samples were compared against a control sample (Sample 57) of the polychloroprene rubber. The test results are given in Table III.

TABLE III

| Sample | SR/g* | Smoke Reduction (%) |
| --- | --- | --- |
| 55 | 115 | 9 |
| 56 | 101 | 20 |
| 57 (Control) | 126 | — |

*Sr/g = Integrated area per gram of sample from smoke curve.

EXAMPLE 56

10 parts by weight of the sulfate product of Example 2 per 100 parts by weight of polymer were added to a poly(vinyl acetate) polymer (Polysciences No. 2025) to form Sample 58 and 10 parts by weight of the sulfate product of Example 3 per 100 parts by weight of polymer were added to a separate sample of the poly(vinyl acetate) polymer to form Sample 59. The two samples were prepared and tested by the afore-mentioned Goodrich Smoke-Char Test and were compared against a control sample (Sample 60) of the poly(vinyl acetate) polymer. The test results are given in Table IV.

TABLE IV

| Sample | SR/g | Smoke Reduction (%) |
| --- | --- | --- |
| 58 | 68 | 11 |
| 59 | 69 | 9 |
| 60 (Control) | 76 | — |

EXAMPLE 57

10 parts by weight of the sulfate product of Example 2 per 100 parts by weight of polymer were added to a polyacrylonitrile polymer (Aldrich 18131-5) to form Sample 61 and 10 parts by weight of the sulfate product of Example 3 per 100 parts by weight of polymer were added to a separate sample of the polyacrylonitrile polymer to form Sample 62. The two samples were prepared and tested by the afore-mentioned Goodrich Smoke-Char Test and were compared against a control sample (Sample 63) of the polyacrylonitrile polymer. The test results are given in Table V.

TABLE V

| Sample | SR/g | Smoke Reduction (%) |
|---|---|---|
| 61 | 83 | 46 |
| 62 | 90 | 42 |
| 63 (Control) | 154 | — |

EXAMPLE 58

10 parts by weight of the sulfate product of Example 2 per 100 parts by weight of polymer were added to a copolymer of styrene and acrylonitrile (Tyril MX-4582.03) to form Sample 64 and 10 parts by weight of the sulfate product of Example 3 per 100 parts by weight of polymer were added to a separate sample of the styrene/acrylonitrile copolymer to form Sample 65. The two samples were prepared and tested by the afore-mentioned Goodrich Smoke-Char Test and were compared against a control sample (Sample 66) of the styrene/acrylonitrile copolymer. The test results are given in Table VI.

TABLE VI

| Sample | SR/g | Smoke Reduction (%) |
|---|---|---|
| 64 | 68 | 19 |
| 65 | 56 | 33 |
| 66 (Control) | 84 | — |

In addition to improvement in smoke retardancy, many sulfate glasses and sulfate glass-ceramic materials also improve the fire retardancy of polymer compositions by promoting a heat resistant hard intumescense char when the composition is exposed to flame.

The improved smoke retardant polymer compositions of this invention are useful wherever smoke resistance is desirable, such as in carpets, house siding, plastic components for airplane and passenger car interiors, wallcoverings, interior house and office trim, etc.

I claim:

1. A smoke retarded composition comprising:
   (A) a smoke retardant amount of finely-divided sulfate glass or sulfate glass-ceramic material or mixture thereof, the said sulfate glass or sulfate glass-ceramic material being comprised of potassium sulfate and zinc sulfate which together form at least 50 mol percent of the glass or glass-ceramic composition, and
   (B) at least one polymer selected from the group consisting of vinyl chloride and vinylidene chloride polymers, polychloroprenes, poly(vinyl acetates), and polymers of acrylonitrile alone or with styrene, or mixtures thereof.

2. A composition of claim 1 wherein said sulfate glass or glass-ceramic or mixture is present in an amount from about 5 to 60 parts by weight per 100 parts by weight of polymer in the composition.

3. A composition of claim 1 wherein said sulfate glass or sulfate glass-ceramic or mixture has an average particle size from about 0.01 to about 800 microns.

4. A composition of claims 2 or 3 wherein the said sulfate glass or sulfate glass-ceramic or mixture comprises a sulfate glass or sulfate glass-ceramic comprised of potassium sulfate, sodium sulfate and zinc sulfate.

5. A composition of claim 2 wherein said sulfate glass or sulfate glass-ceramic or mixture has an average particle size from about 0.5 to about 50 microns.

6. A composition of claim 2 wherein the said sulfate glass or sulfate glass-ceramic or mixture comprises a sulfate glass or sulfate glass-ceramic comprised of potassium sulfate, zinc sulfate and a transition metal sulfate.

7. A composition of claim 2 wherein the said sulfate glass or sulfate glass-ceramic or mixture comprises a sulfate glass or sulfate glass-ceramic comprised of potassium sulfate, sodium sulfate, zinc sulfate and nickel sulfate.

8. A composition of claims 2 or 3 wherein said polymer is a vinyl chloride or vinylidene chloride polymer or a mixture thereof.

* * * * *